United States Patent [19]
Rieger

[11] 4,283,765
[45] Aug. 11, 1981

[54] GRAPHICS MATRIX MULTIPLIER

[75] Inventor: Michael L. Rieger, Tigard, Oreg.

[73] Assignee: Tektronix, Inc., Beaverton, Oreg.

[21] Appl. No.: 42,392

[22] Filed: May 25, 1979

Related U.S. Application Data

[63] Continuation of Ser. No. 896,538, Apr. 14, 1978, abandoned.

[51] Int. Cl.³ .................. G06F 15/347; G06F 3/14
[52] U.S. Cl. .................. 364/521; 364/515;
364/520; 364/718; 364/754
[58] Field of Search ............... 364/515, 518, 520–522,
364/719, 731, 747, 754, 757, 718

[56] References Cited
U.S. PATENT DOCUMENTS

| | | |
|---|---|---|
| 3,636,314 | 1/1972 | Kan et al. .................. 364/520 X |
| 3,725,563 | 4/1973 | Woycechowsky .............. 364/731 X |
| 3,763,365 | 10/1973 | Seitz .................. 364/754 |
| 3,976,982 | 8/1976 | Eiselen .............. 364/515 X |
| 4,023,027 | 5/1977 | Strathman et al. ............. 364/719 X |
| 4,115,863 | 9/1978 | Brown .......................... 364/719 X |

*Primary Examiner*—Jerry Smith
*Attorney, Agent, or Firm*—Thomas J. Spence

[57] ABSTRACT

A matrix multiplier is disclosed for rotating, scaling, shearing, and stretching, three-dimensional calligraphic images. This system has particular application to incremental vector generators. The transformations are performed in real time and at the drawing rate of the display device (CRT, plotter, etc.). Complex curved images are transformed as quickly as straight lines. This system reduces matrix multiplication to incremental additions distributed along each line of an image as it is drawn.

4 Claims, 11 Drawing Figures

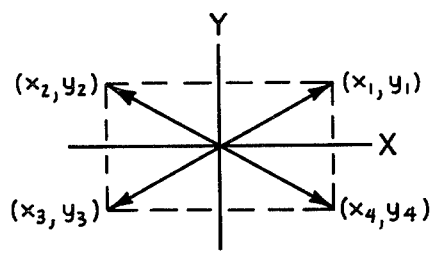
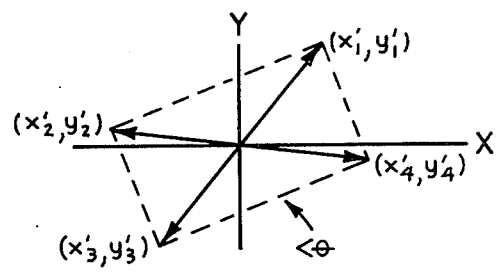
FIG 1A  FIG 1B
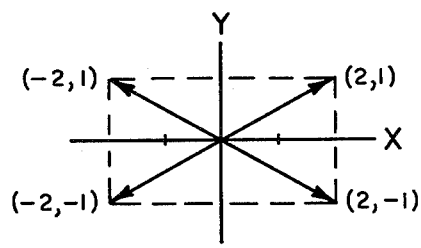
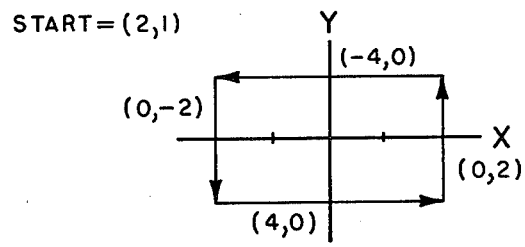
FIG 2A  FIG 2B
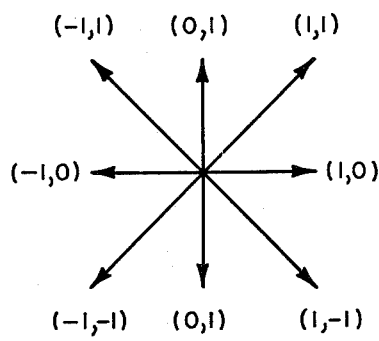
FIG 3

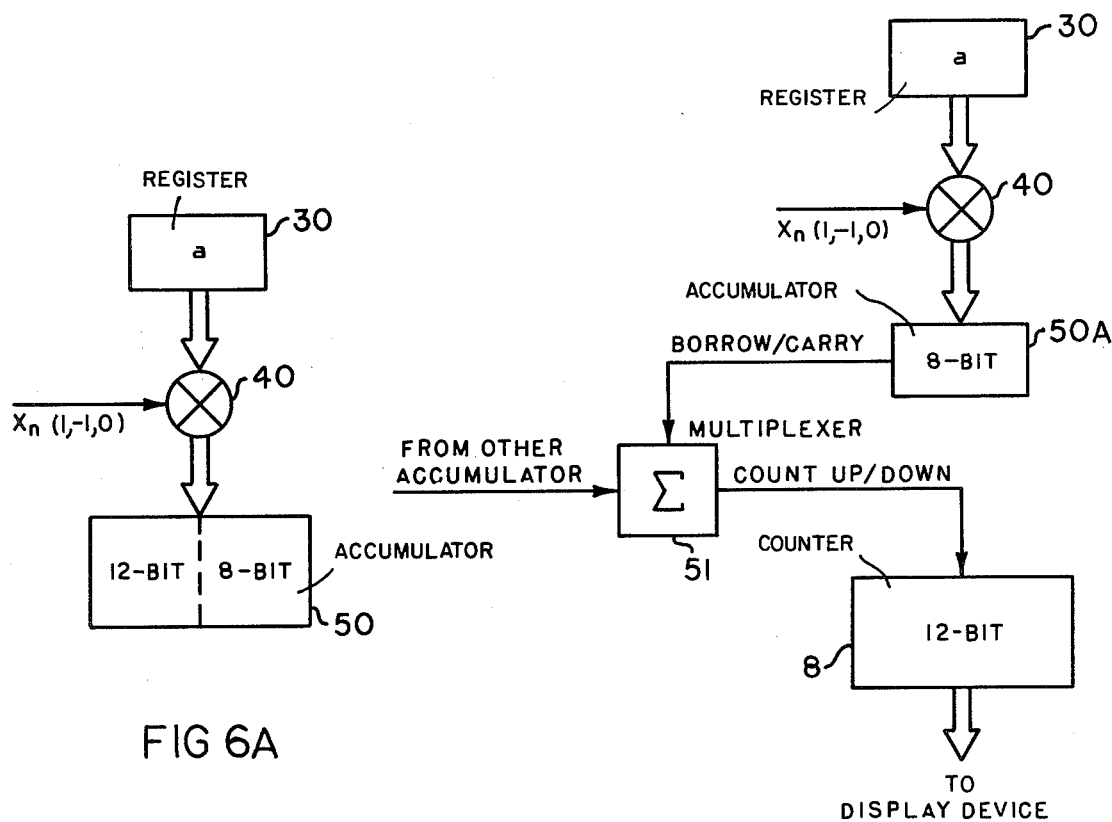
FIG 6A
FIG 6B
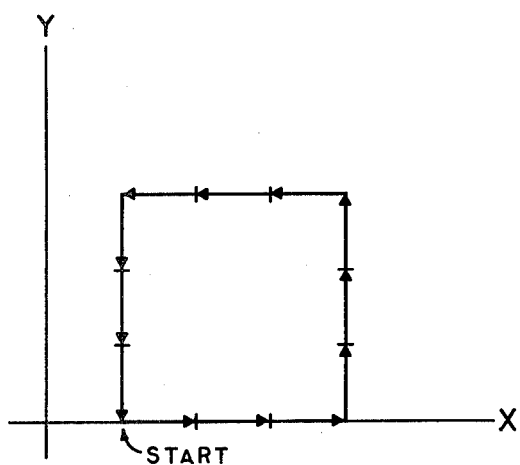
FIG 7A
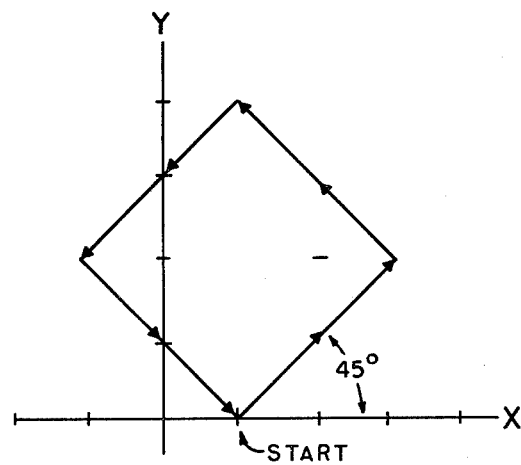
FIG 7B

GRAPHICS MATRIX MULTIPLIER

This is a continuation, of application Ser. No. 896,538 filed Apr. 14, 1978 and now abandoned.

BACKGROUND OF THE INVENTION

This invention relates generally to a method for generating real-time geometric transformation is of 3-D calligraphic images. More specifically it relates to a matrix multiplier system for use with incremental display systems.

In graphic display systems, lines are drawn between data points in a Cartesian coordinate system having a horizontal (X) and vertical (Y) axis (and a Z axis in three-dimensional displays). These data points are represented as coordinate pairs; e.g., $x_1, y_1; x_2, y_2; x_3, y_3$; etc.

In the field of computer graphics, the ability to generate real-time geometric transformations has many uses. The user can scale a picture up so that details appear more clearly, or down so that more of the picture is visible. It is also useful to be able to rotate or distort an image.

Because of the large number of coordinate pairs required to represent a complex image, there is a need for a transformation device that operates at the drawing rate of the display; and, therefore, does not cause delays. As an example of prior art matrix multipliers, those interested are referred to U.S. Pat. No. b 3,763,365 by Charles L. Seitz. Therein is described a matrix multiplier used in an absolute coordinate system and utilizing homogeneous coordinates.

The present invention, in contrast, is directed toward an incremental rather than an absolute display system and is not complicated by using homogeneous coordinates. The inherent simplicity of the present invention makes it a true real-time system and greatly reduces the number of electronic components that would normally be required. Further, the present invention maintains high accuracy and is able to transform arbitrary shapes as fast as straight lines.

SUMMARY OF THE INVENTION

According to the present invention, each incremental vector generated by a digital incremental vector generator is multiplied by a transformation matrix to achieve real-time geometric transformations of calligraphic images. The present invention is connected between the digital interpolator and X-axis and Y-axis counters of a conventional incremental vector generator. It contains registers for storing the transformation matrix coefficients, multipliers for multiplying the incremental vectors, and accumulators for storing the results of the multiplications. The output of the accumulators is a series of up/down and left/right pulses to the X and Y counters. In a CRT display system, these counters drive digital-to-analog convertors which, in turn, drive the CRT beam.

As mentioned above, the present invention is essentially a matrix multiplier. However, an incremental numerical technique is implemented that simplifies the system by reducing the multiplication to a series of additions that are distributed along each line as it is drawn. This technique permits curved figures to be transformed as fast as straight lines.

Thus, it is a primary object of the present invention to provide a novel apparatus for generating geometric transformations of three-dimensional calligraphic images at the drawing rate of the display device.

It is another object to provide an apparatus that will transform arbitrary shaped images as fast as straight lines.

It is a further object to provide an apparatus that reduces the transformation operation to a single step.

The invention, however, both as to organization and method of operation, together with further advantages and objects thereof may best be understood by reference to the following description taken in connection with the accompanying drawings wherein like reference numerals refer to like elements.

DESCRIPTION OF THE DRAWINGS

In the drawings:

FIG. 1 which comprises FIGS. 1A and 1B is a rectangle drawn with absolute vectors shown in its normal and rotated position;

FIG. 2 which comprises FIGS. 2A and 2B is a rectangle drawn with absolute and relative coordinates;

FIG. 3 is representation of the eight possible incremental horizontal and vertical moves.

FIG. 6 which comprises FIGS. 6A and 6B is a more detailed diagram of the coefficient register-multiplier-accumulator portion of the invention; and FIG. 7 which comprises FIGS. 7A and 7B is a square in its normal position and rotated 45 degrees about its starting point by the present invention.

DETAILED DESCRIPTION OF THE INVENTION

Figure 4:
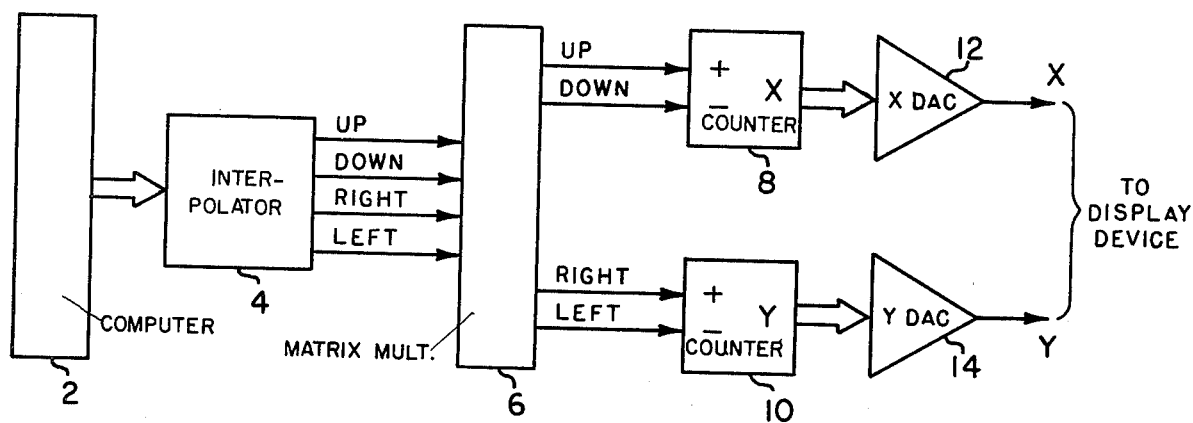
FIG. 4 is a block diagram of a graphics display device that incorporates the present invention.

As explained above, it is often necessary, in the field of computer graphics, to transform graphic images. These images are comprised of points and the lines that join them. The ability to transform these points and lines is one of the basics of computer graphics.

A point can be represented by its coordinates. In two dimensions the coordinates can be specified as the elements of a one-row, two-column matrix [x, y]. In three dimensions a one by three matrix [x, y, z] is used. These row matrixes are normally called vectors. Further, a straight line can be defined by two vectors which specify the coordinates of its end points. The position and orientation of the line joining these two end points can be altered by operating on their vectors. Therefore, an image may be transformed by operating on the individual lines of which it is constructed.

The present invention is essentially a matrix multiplier. It transforms images by multiplying the lines thereof by a transformation matrix. It is well known to those skilled in the art that matrix multiplication is a convenient method for specifying and implementing geometric transformations of three-dimensional calligraphic images. A thorough discussion of matrix notation and algebra may be found in "Matrix Theory for Electrical Engineers" written by A.M. Tropper and published by Addison-Wesley, Inc., while a discussion of the application of matrix algebra to geometric transformations may be found in "Mathematical Elements for Computer Graphics" written by D. F. Rodgers and J. A. Adams and published by McGraw-Hill Book Company.

The graphics matrix multiplier system performs five basic transformation operations on images: rotation, scaling, stretching, shearing, and identity. The general form of the transformation matrix used is as follows:

$$\begin{bmatrix} a & b \\ c & d \end{bmatrix}$$

where a, b, c, and d are defined as the transformation coefficients.

The above-described general matrix is for a two-dimensional transformation. For the sake of illustration, only two-dimensional transformations will be considered. It will be obvious from the description that follows that a three-dimensional transformation may be easily accomplished using the present invention.

The specific two-dimensional matrices for implementing the basic transformation operates of the system are:

$$\begin{bmatrix} \cos \phi & \sin \phi \\ -\sin \phi & \cos \phi \end{bmatrix}$$

where $\theta$ is the angle of rotation

Scaling: $\begin{bmatrix} a & 0 \\ 0 & a \end{bmatrix}$

Stretching: $\begin{bmatrix} a & 0 \\ 0 & 1 \end{bmatrix}$

Shearing: $\begin{bmatrix} 1 & 0 \\ c & 1 \end{bmatrix}$

Identity: $\begin{bmatrix} 1 & 0 \\ 0 & 1 \end{bmatrix}$

The five transformation matrices are the basic building blocks for more complex transformations. Two of these matrices may be multiplied together to create a second matrix that combines the two original operations. Multiplying a vector by this second matrix is equivalent to multiplying it by each original transformation matrix in sequence.

Referring now to the drawings, FIG. 1 is an example of a simple two-dimensional transformation. Shown is a rectangle centered at the origin of a Cartesian coordinate system. The four component vectors representing the corners of the rectangle are shown as arrows in the drawing. To rotate this rectangle around the origin by an angle $\theta$, each vector is multiplied by the rotation matrix:

$$[x_n, y_n] \cdot \begin{bmatrix} \cos \theta & \sin \theta \\ -\sin \theta & \cos \theta \end{bmatrix} = [x_n', y_n'] \quad (1)$$

The rotated rectangle is shown in FIG. 1b.

As previously mentioned, the images being transformed are composed of straight lines that are specified by vectors. There are two fundamental ways to define a vector: absolute and relative. The absolute method specifies the absolute coordinates of the end points of a line. The relative method specifies the displacement between end points. The vector generator interpolates a straight line between the end points. FIG. 2 shows a rectangle specified using both coordinate systems. FIG. 2a uses the absolute and FIG. 2b uses relative system.

A disadvantage of the absolute coordinate system is that an extra coordinate must be added to the vector specification and an extra row and column must be added to the transformation matrix to accommodate a transformation not centered at the origin. This is the well-known system of homogeneous coordinates described in U.S. Pat. No. 3,763,365 and various texts. Using this method, a rotation, for example, about an arbitrary point is accomplished by first translating the center of rotation to the origin, performing the required rotation, and then translating the result back to the original center of rotation. This process must be carried out on each vector of the image being transformed.

The present invention utilizes the incremental or relative coordinate system which avoids the foregoing disadvantage. When an image is constructed using relative vectors, the coordinates of the first or starting point must be specified relative to the origin. Thereafter each successive vector is specified by its position relative to the current vector. An image constructed of relative vectors is transformed by multiplying each relative vector by only the appropriate transformation matrix. Images not centered at the origin do not require translation. The specified starting point of the relative image is the center of transformation (e.g., rotation). Also, to translate an image constructed with relative vectors it is only necessary to translate the starting point, while images constructed with absolute coordinates are translated by translating each individual vector.

As mentioned above, the present invention operates with relative or incremental coordinates. Incremental graphics display systems typically generate images digitally. These real-time digital signals are conveniently represented by incremental vertical and horizontal movement of the drawing means (e.g., CRT beam, plotting pen, etc.). For example, in a CRT display system, the CRT beam is moved from its present position to one of eight adjacent points as shown in FIG. 3. It can be seen from FIG. 3 that any relative vector can be specified by using only the digits $+1$, $-1$, or 0. Therefore, to simplify the system, these are the only coordinates used by the present invention and are hereinafter referred to as micro vectors.

As previously explained, a transformation is accomplished by a series of matrix multiplications on the relative vectors. The general case thereof is illustrated below:

$$[x_n, y_n] \cdot \begin{bmatrix} a & b \\ c & d \end{bmatrix} = [x_n', y_n'] \quad (2)$$

$$x_n' = a \cdot x_n + c \cdot y_n \quad (3)$$
$$y_n' = b \cdot x_n + d \cdot y_n \quad (4)$$

The coordinates of the transformed image are determined by summing the relative vectors:

$$X_n = X_{start} + \sum_{j=1}^{n} x_j' \quad (5)$$

$$Y_n = Y_{start} + \sum_{j=1}^{n} y_j' \quad (6)$$

Since the coordinates $X_n$ and $Y_n$ are limited to 1, $-1$, or 0, equations 3 and 4 may be combined with equations 5 and 6 to yield general equations 7 and 8 for the coordinates of the transformed image.

$$X_0 = X_{N-1} + \sum_{j=1}^{N} a \cdot x_j + c \cdot y_j \quad (7)$$

$$Y_0 = Y_{N-1} + \sum_{j=1}^{N} b \cdot x_j + d \cdot y_j \quad (8)$$

Thus, it can be seen from equations 7 and 8 that the matrix multiplication has been reduced to a series of incremental additions.

A graphics display generating system that includes the present invention is shown in block diagram form in FIG. 4. A computer or like device 2 is connected to digital interpolator 4 which may be of the straight line or circular arc type. The graphics matrix multiplier system 6 is connected between interpolator 4 and the X-axis and Y-axis up/down 12-bit binary counters 8 and 10. The parallel outputs of counter 8 are fed to the X-axis digital-to-analog converter (DAC) 12 while the outputs of counter 10 are fed to the Y-axis digital-to-analog converter (DAC) 14. The analog outputs of the DAC's drive the display device.

Computer 2 outputs to interpolator 4 an instruction which causes it to generate the necessary clock pulses to fit a line between two points. These pulses represent the $+1$, $-1$, and 0 coordinates described above. In the X-axis, a $+1$ moves the drawing means of the display device up and a $-1$ moves the drawing means down. Similarly, a $+1$ in the Y-axis indicates movement to the right and a $-1$ indicates movement to the left. A 0 in either axis, obviously, indicates no movement at all. These coordinates are multiplied by the graphics matrix multiplier 6. The transformed coordinates create a series of outputs from up/down counters 8 and 10 to DAC's 12 and 14. The analog output of the DAC's causes the line to be drawn.

Since the vector generator used is a conventional digital incremental vector generator, a detailed discussion is not provided. Information on incremental vector generators may be found in "Information Display Concepts" by Nick Stadtfeld, published by Tektronix, Inc. In addition, a detailed explanation of digital (straight-line and circular arc) interpolation may be found in "The Design of Digital Systems" written by John B. Peatman, published by McGraw-Hill, Inc.

Figure 5:
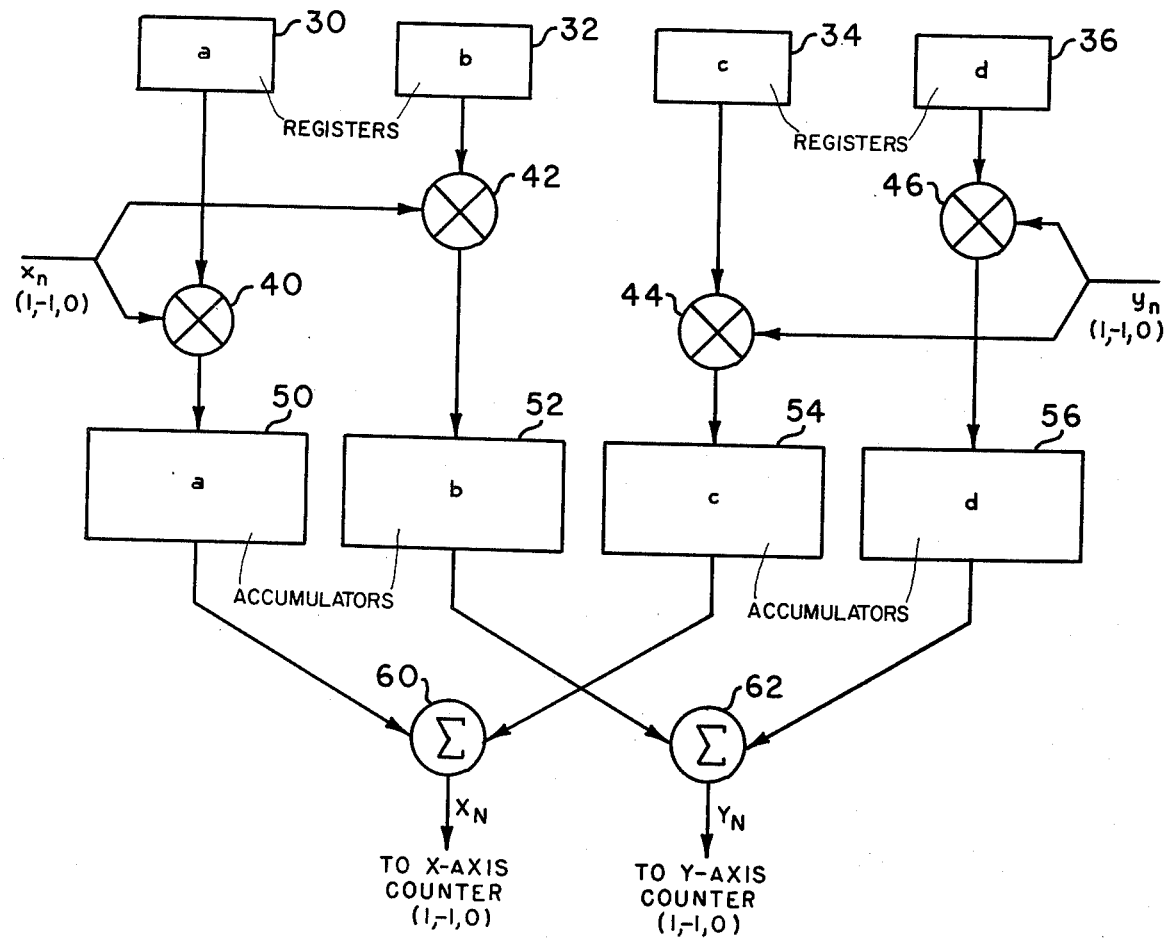
FIG. 5 is a general block diagram of the present invention.

FIG. 5 is a general block diagram of the preferred embodiment of the present invention for transforming two-dimensional images. Coefficient registers 30, 32, 34, and 36 are loaded, by the computer, with 8-bit binary numbers representing the previously discussed transformation matrix coefficients a, b, c, and d, respectively. The output of each of these registers is connected to a multiplier. The coefficient stored in the register is transferred to the appropriate multiplier under computer control and multiplied with one coordinate of the vector being transformed. The x-axis coordinate, $x_n$, is multiplied in multiplier 40 by the contents of register 30 and in multiplier 32 by the contents of register 32. Likewise, the Y-axis coordinate, $y_n$, is multiplied in multiplier 44 by the contents of the c register and in multiplier 46 by the contents of the d register. The results of these multiplications are accumulated in accumulators 50, 52, 54, and 56. Each time a new multiplication is made, the result is added to the previous contents of the accumulator and the resulting sum is retained. The outputs of accumulators 50 and 54 are connected to summer 60 wherein they are algebraically added. The result is the transformed X-axis coordinate of the vector being transformed. Summer 62 performs the same function for accumulators 52 and 56 and produces the transformed Y-axis axis coordinate. It can be seen from the foregoing description that the present invention as shown in FIG. 5 implements equations 7 and 8.

The contents of accumulators 50, 52, 54, and 56 are products; therefore, to avoid truncation errors, the accumulator bit length must be as long as the transformation coefficient bit length plus the bit length of the coordinate. If, for example, the display device image area is 4096 by 4096 points, 12 bits are required to specify a coordinate ($2^{12} = 4096$); and if, as in the preferred embodiment of the present invention, the transformation coefficient is 8 bits long, the accumulator must be capable of holding a 20-bit product. This 20-bit product is truncated to 12 bits to accommodate the 12-bit addressability of the X and Y axis binary counters; however, to maintain 20-bit resolution, the other 8 bits are retained in a fractional accumulator. This is implemented by dividing the accumulator into a 12-bit integer part and a 8-bit fractional part as shown in FIG. 6a.

The present invention includes a simplified version of the generalized coefficient register-multiplier-accumulator chain described above. This simplification is a result of constraining the transformation coefficients to be between $+1$ and $-1$. If the transformation coefficient is so constrained, the integer part of the accumulator will only increment or decrement once for each display coordinate, added to the accumulator, that generates a carry or borrow from the fractional part of the accumulator. Since only the carrys or borrows need to be accumulated, the integer part can be a 12-bit up/down binary counter. FIG. 6b shows accumulator 50 separated into two parts 50a and 8. Accumulator 50a is the 8-bit fractional accumulator and 8 is the previously described 12-bit X-axis up/down counter that accumulates the carry or borrow outputs of 50a. This carry or borrow output is multiplexed, by multiplexer 51, with the carry or borrow signal from accumulator 54 to produce a count up/down signal that goes to counter 8 and on to the display device.

Operation of the register-multiplier-accumulator chain is best understood by illustration. For example, consider the square shown in FIG. 7. FIG. 7a is the original square and FIG. 7b is the same square rotated 45 degrees about its starting point. In order to maintain simplicity, a two-dimensional rotation is shown.

Each coordinate of the square must be multiplied by the following matrix:

$$\begin{bmatrix} .7 & .7 \\ -.7 & .7 \end{bmatrix}$$

The chart below shows the various steps in the generation of the rotated square.

| ORIGINAL COORDINATES | | FRACTIONAL ACCUMULATORS CONTENTS | | | | MULTIPLEXER OUTPUT TO DISPLAY COUNTERS | |
|---|---|---|---|---|---|---|---|
| X | Y | A | B | C | D | X | Y |
| — | — | .5 | .5 | .5 | .5 | — | — |
| 1 | 0 | .2 | .2 | .5 | .5 | 1 | 1 |
| 1 | 0 | .9 | .9 | .5 | .5 | 0 | 0 |
| 1 | 0 | .6 | .6 | .5 | .5 | 1 | 1 |
| 0 | 1 | .6 | .6 | .8 | .2 | −1 | 1 |

| ORIGINAL COORDINATES | | FRACTIONAL ACCUMULATORS CONTENTS | | | | MULTIPLEXER OUTPUT TO DISPLAY COUNTERS | |
|---|---|---|---|---|---|---|---|
| | | X | | Y | | | |
| 0 | 1 | .6 | .6 | .1 | .9 | 0 | 0 |
| 0 | 1 | .6 | .6 | .4 | .6 | −1 | 1 |
| −1 | 0 | .9 | .9 | .4 | .6 | −1 | −1 |
| −1 | 0 | .2 | .2 | .4 | .6 | 0 | 0 |
| −1 | 0 | .5 | .5 | .4 | .6 | −1 | −1 |
| 0 | −1 | .5 | .5 | .1 | .9 | 1 | −1 |
| 0 | −1 | .5 | .5 | .8 | .2 | 0 | 0 |
| 0 | −1 | .5 | .5 | .5 | .5 | 1 | −1 |

Before the drawing process begins, the fractional part of each accumulator contains an arbitrary number; for example, 0.5. Then the x coordinate is multiplied by the contents of transformation coefficient registers a and b; and the Y coordinate is multiplied by the contents of transformation coefficient registers c and d. The result of this multiplication is added to the accumulator. The carry or borrow signal from the fractional part of the a accumulator is multiplexed with the carry or borrow signal from the c accumulator. Likewise, the b and d accumulators carry or borrow outputs are multiplexed. Of course, the carry is a +1 and the borrow is a −1 signal. As stated before, because the X and Y axis coordinates are limited to +1, −1, and 0, the matrix multiplication becomes an incremental addition.

Referring to the chart, operation on the first vector (1,0) results in 0.7 from the a and b coefficient registers being added to the a and b accumulators, generating a carry signal (+1) from each and producing an x, y output of 1, 1. The next operation also adds 0.7 to the a and b accumulators, but neither produces a carry or borrow and the output is 0,0. The same process is carried on to complete the chart and rotate the square. Each vector is rotated as it is generated.

The foregoing description pertains to two-dimensional images and transformations. However, a simple iterative design method is required to accommodate three dimensions. For example, a vector is represented as:

$[x_n, y_n, z_n]$ and the transformation matrix is:

$$\begin{bmatrix} a & b & c \\ d & e & f \\ g & h & i \end{bmatrix}$$

While there has been shown and described the preferred embodiment of the present invention, it will be apparent to those skilled in the art that many changes and modifications may be made without departing from the invention in its broader aspects. Therefore the appended claims are intended to cover all such modifications and changes that fall within the true spirit and scope of the invention.

The invention is claimed in accordance with the following:

1. A graphic display system for transforming and displaying computer-generated images of a pre-determined number of dimensions, D, on a display device, the display system comprising:
   a digital interpolator for converting a computer instruction into digital clock pulses for driving the display device;
   a matrix multiplier coupled to said digital interpolator for receiving said digital clock pulses and altering the sequence thereof according to data stored in said matrix multiplier, said matrix multiplier including accumulators which are each divided into an integer part and a fractional part, said integer part accumulating m bits and said fractional part accumulating n bits and having a carry/borrow output;
   m-bit counters comprising said integer part and also comprising axis counters of the display system for counting said digital clock pulses; and
   digital-to-analog converters connected to receive the output of said m-bit counters for converting said output to analog signals for driving the display device.

2. The graphic display system of claim 1 wherein said matrix multiplier further comprises:
   $D^2$ registers for storing the elements of a D by D matrix, said elements being constrained to between −1 and +1 and each one of said $D^2$ registers is connected so as to store one of said elements;
   $D^2$ multipliers, each one thereof coupled to a different one of said $D^2$ registers, to receive one of said matrix elements therefrom and for multiplying said one of said matrix elements with said digital clock pulses;
   $D^2$ accumulators, each one thereof connected to a different one of said $D^2$ multipliers, for temporarily storing the output thereof; and
   D summing means, each one coupled to D of said $D^2$ accumulators, for receiving and summing the output of said D accumulators.

3. The graphic display system of claim 2 wherein said matrix multiplier further comprises D multiplexers connected to the carry/borrow output of D of said fractional accumulators.

4. The graphic display system of claim 3 wherein the output of said D multiplexers is connected each one to a different one of said m-bit counters.

* * * * *